United States Patent [19]

Taniuchi

[11] Patent Number: 4,598,996
[45] Date of Patent: Jul. 8, 1986

[54] TEMPERATURE DETECTOR

[75] Inventor: Tetsuo Taniuchi, Katano, Japan

[73] Assignee: Matsushita Electric Industrial Co., Ltd., Kadoma, Japan

[21] Appl. No.: 453,881

[22] PCT Filed: May 6, 1982

[86] PCT No.: PCT/JP82/00155
§ 371 Date: Dec. 14, 1982
§ 102(e) Date: Dec. 14, 1982

[87] PCT Pub. No.: WO82/03914
PCT Pub. Date: Nov. 11, 1982

[30] Foreign Application Priority Data

May 7, 1981 [JP] Japan .............................. 56-69085
Nov. 17, 1981 [JP] Japan .............................. 56-184581

[51] Int. Cl.⁴ .......................... G01J 5/58; G01K 11/12
[52] U.S. Cl. ....................................... 356/43; 356/44; 374/131
[58] Field of Search ................. 356/43, 44; 250/227; 374/130, 161, 131, 132, 133; 350/387, 405

[56] References Cited

U.S. PATENT DOCUMENTS

| | | | |
|---|---|---|---|
| 2,718,170 | 9/1955 | Lyot | 350/405 X |
| 3,395,960 | 7/1968 | Chang et al. | 350/387 X |
| 3,506,929 | 4/1970 | Ballman et al. | 350/387 X |
| 3,529,885 | 9/1970 | Amman | 350/405 |
| 4,140,393 | 2/1979 | Cetas | 356/44 X |
| 4,356,396 | 10/1982 | Ruell et al. | 250/227 |
| 4,367,040 | 1/1983 | Goto | 356/44 |

FOREIGN PATENT DOCUMENTS 50-9478  1/1975  Japan .

Primary Examiner—Vincent P. McGraw
Assistant Examiner—S. A. Turner
Attorney, Agent, or Firm—Cushman, Darby & Cushman

[57] ABSTRACT

In an optical fiber type temperature detector using temperature change of refraction index in birefringent crystal, by using $LiTaO_3$ or $Sr_xBa_{1-x}Nb_2O_6$ single crystal ($0.5 < x < 1.0$) as material (13) for sensor and quartz as material for setting temperature range, a high sensitive and highly stable temperature detector using light emitting diode as light source is realized. Furthermore, as configuration of sensor part, miniaturization and light weight is devised by disposing rutile (11) or calcite between optical fibers (8, 9) and rod lens (12) to make polarization separation.

3 Claims, 7 Drawing Figures

TEMPERATURE DETECTOR

FIELD OF THE TECHNOLOGY

The present invention relates to a temperature detector using optical fibers, which temperature detector can be utilized in technical field of temperature measurement of a high tension system apparatuses, long-distance remote temperature measurement, or the like.

BACKGROUND OF TECHNOLOGY

Temperature detector utilizing optical fibers is one of extremely high necessity as measuring apparatus to replace the conventional electric temperature detector under bad environment where electromagnetic induction noise or electric insulation comes into problem. Or again, in a remote measuring system utilizing a communication system of low-loss optical fiber, an element which transfer external physical amount, such as, temperature directly into light signal without once transforming into electric signal becomes important one.

FIG. 1 shows a configuration of conventionally proposed temperature detector using optical fiber for such use. The temperature detector consists of a birefringent crystal 1 for temperature detection, optical fibers 2, 7, lens 3, 6, sensor part consisting of a polarizer 4 and an analyzer 5 with their transparency polarization directions having right angle each other, light emitting part 2 (not shown) connected to the other end of the optical fiber 2, and received light signal processing part (not shown) connected to the other end of the optical fiber 7.

Operation of the temperature detector of such configuration is elucidated; for instance at a temperature of $T_1$ the direction of polarization of light passing the birefringent crystal 1 does not substantially change, accordingly the direction of polarization of light after passing the crystal 1 is in the state having right angle to the direction of transmitted polarized light of the analyzer 5, the light passing is hindered by the analyzer 5 and light output intensity of the optical fiber 7 becomes minimum. Next, as temperature rises the direction of polarization of light passing the birefringent crystal 1 becomes to change during the passing; for instance at the temperature $T_2 (T_1 < T_2)$ a part of light which passes the birefringent crystal 1 becomes of the same polarization direction as the transmitted polarized light of the analyzer 5 and light output intensity of the optical fiber becomes maximum. Since the light output of the optical fiber 7 changes responding to temperature of the birefringent crystal 1 in this manner, by detecting the light intensity the temperature of the part where the birefringent crystal 1 is located can be known. Incidentally, in the said configuration, transparency polarizing direction of the polarizer 4 and analyzer 5 are set to have right angle each other, but these directions are set parallelly.

In such temperature detector, as the light source a use of light emitting diode in which characteristic is stable and price is cheap, is preferable, but in the conventional way of using the light emitting diode, there have been made no study as to which material for the birefringent crystal 1 may be used.

Furthermore, there has been made no study as to in which range of characteristic curve of temperature and light output intensity of the birefringent crystal 1 an operation range should be determined in order that a highest accuracy measurement can be made.

Still furthermore, there has been made no study at all as to how measurement error due to fluctuation of loss of light passing through optical fibers 2, 7 is prevented.

Summarizing the above, although the temperature detector using the optical fiber is observed hopeful as measurement apparatus usable under a bad condition where electromagnetic induction noise, electric insulation, etc., are the question, it has not come to actual use since studies of the above-mentioned points have not been made so far.

DISCLOSURE OF THE INVENTION

Accordingly, the temperature detector of the present invention, by sufficiently studying the above-mentioned conventional technical points, realized actually very useful temperature detector. That is, temperature detector of the present invention uses $LiTaO_3$ single crystal or $Sr_xBa_{1-x}Nb_2O_6$ single crystal $(0.5 < x < 1.0)$ is used as temperature detecting birefringent material with which a light emitting diode of high reliability and stability as light source is usable, is used.

Furthermore, the temperature detector of the present invention uses $LiTaO_3$ single crystal of $Sr_xBa_{1-x}Nb_2O_6$ single crystal $(0.5 < x < 1.0)$, and temperature range setting element consisting of quartz for determining optimum operation range of light incident to these single crystals is provided.

THE BEST MODE FOR CARRYING OUT THE INVENTION

Figure 1:
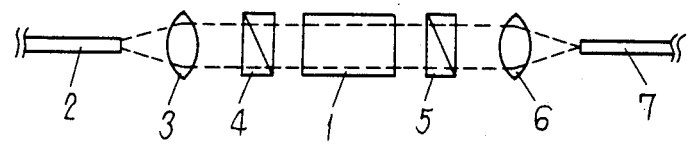
FIG. 1 is configuration diagram of a conventional temperature detector.
Figure 2:
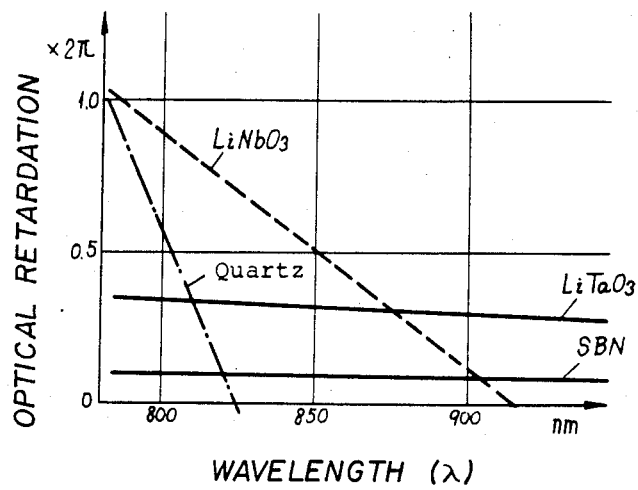
FIG. 2 is a graph showing characteristics of various birefringent crystals.
Figure 3:
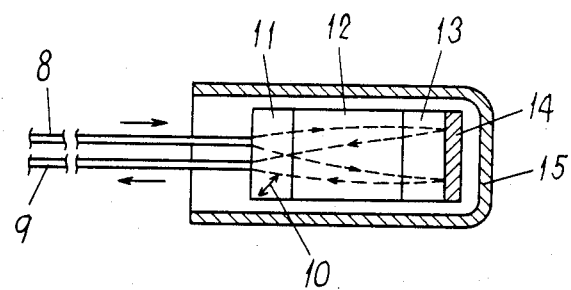
FIG. 3 is configuration diagram of a temperature detector in a first embodiment of the present invention.
Figure 4:
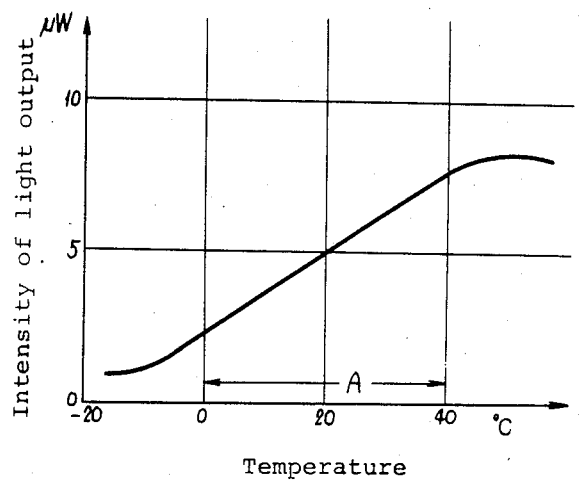
FIG. 4 is a graph showing measured results of temperature characteristic of the temperature detector.
Figure 5:
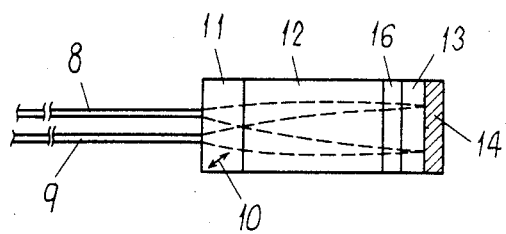
FIG. 5 is a configuration diagram of a temperature detector in a second embodiment of the present invention.
Figure 6:
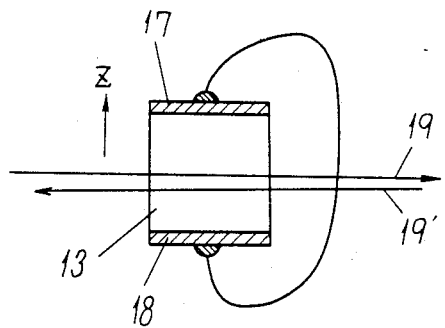
FIG. 6 is a configuration diagram of a temperature detector in a third embodiment of the present invention.
Figure 7:
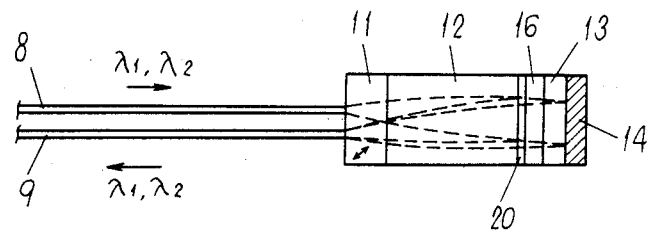
FIG. 7 is a configuration diagram of a temperature detector in a fourth embodiment of the present invention.

For a light source for a temperature detector, either a semconductor laser or a light emitting diode may be used, but the semiconductor laser has many problems at the present time for a light source for stable measurement because of reflection light noise, mode distribution noise, speckle noise, etc. On the contrary, output stability of the light emitting diode is superior and also it is cheap and suitable as light source for temperature detection apparatus. However, since the light emitting diode has spectral spread of about 30–100 nm, birefringent crystal which can be utilized for temperature detection becomes limited. As representatives of birefringent crystal for temperature detection is $LiNbO_3$, $LiTaO_3$, $SiO_2$ (quartz) or the like is considered, but in order that the light emitting diode having the spectral spread is usable, difference of birefringent indices of the crystal must be small. That is, optical retardation $\phi$ is represented by the following equation, when the birefringent indices are $n_1$, $n_2$, and thickness of the crystal is l: